Nov. 14, 1933.    G. MIDBOE    1,934,992
RETRACTABLE LANDING GEAR
Filed March 13, 1933    5 Sheets-Sheet 1

INVENTOR
GABRIEL MIDBOE.
BY
Toulmin & Toulmin
ATTORNEYS

Nov. 14, 1933.          G. MIDBOE          1,934,992
             RETRACTABLE LANDING GEAR
          Filed March 13, 1933     5 Sheets-Sheet 2
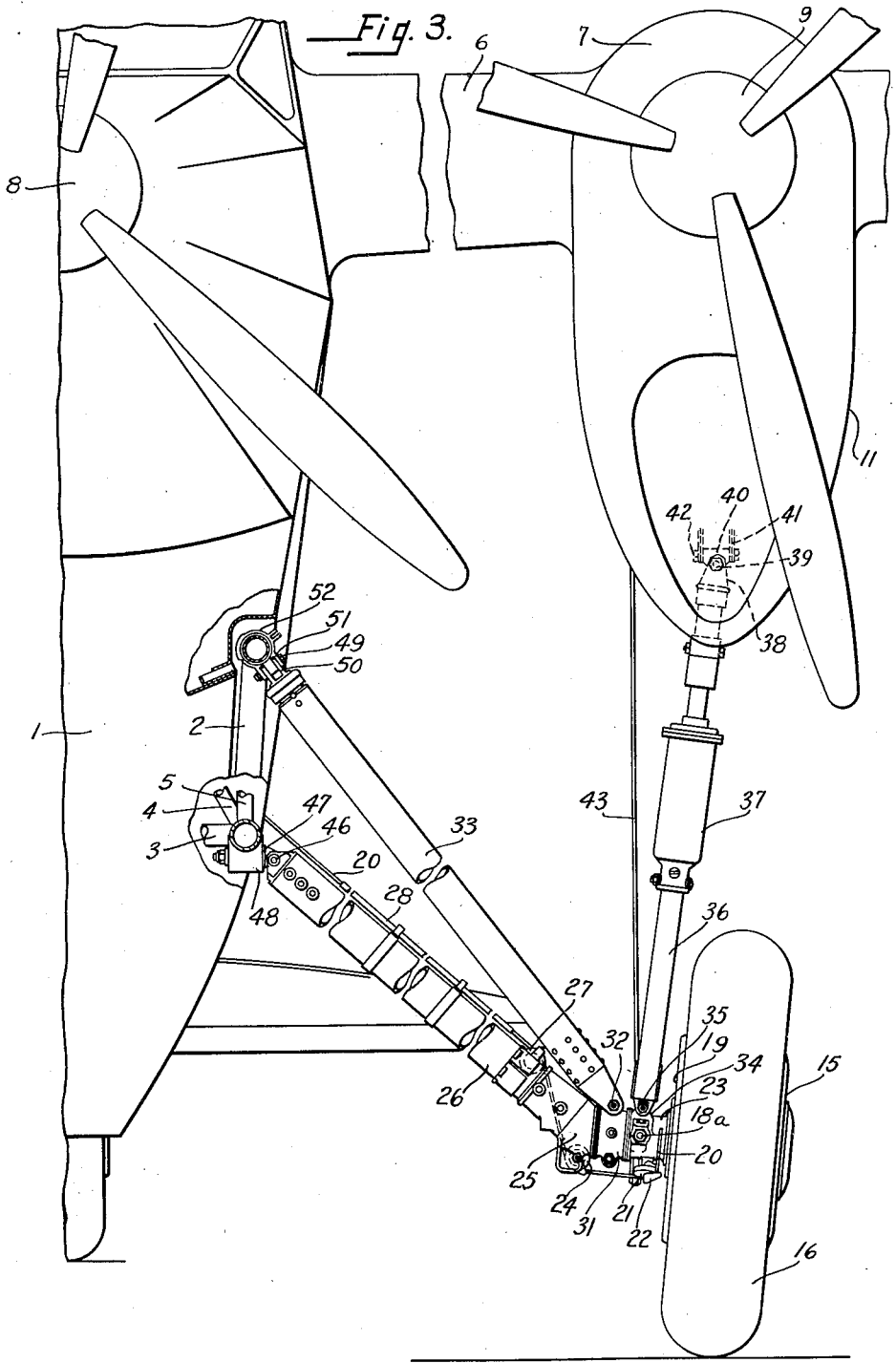
INVENTOR
GABRIEL MIDBOE.
BY Toulmin & Toulmin
ATTORNEYS

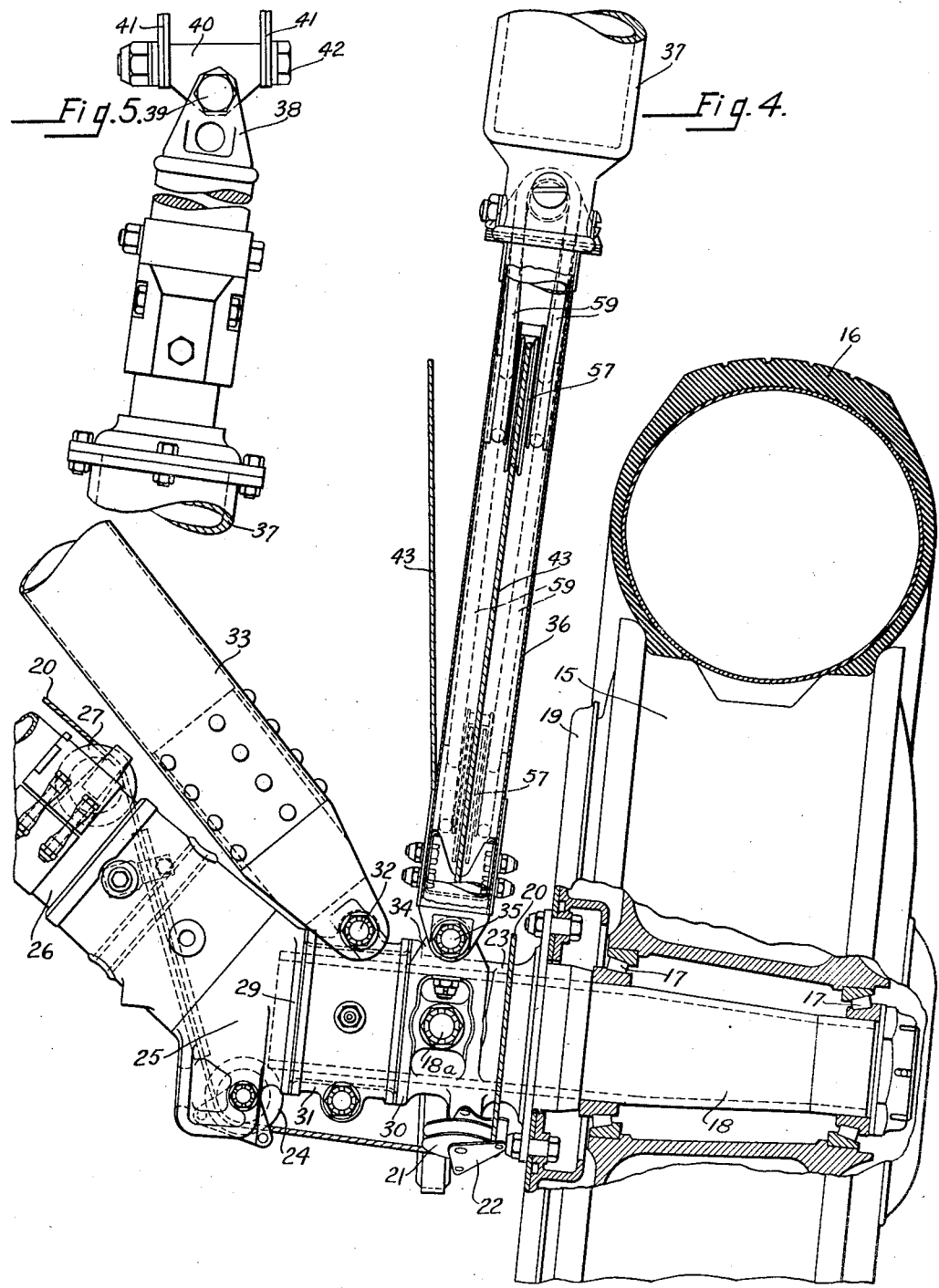

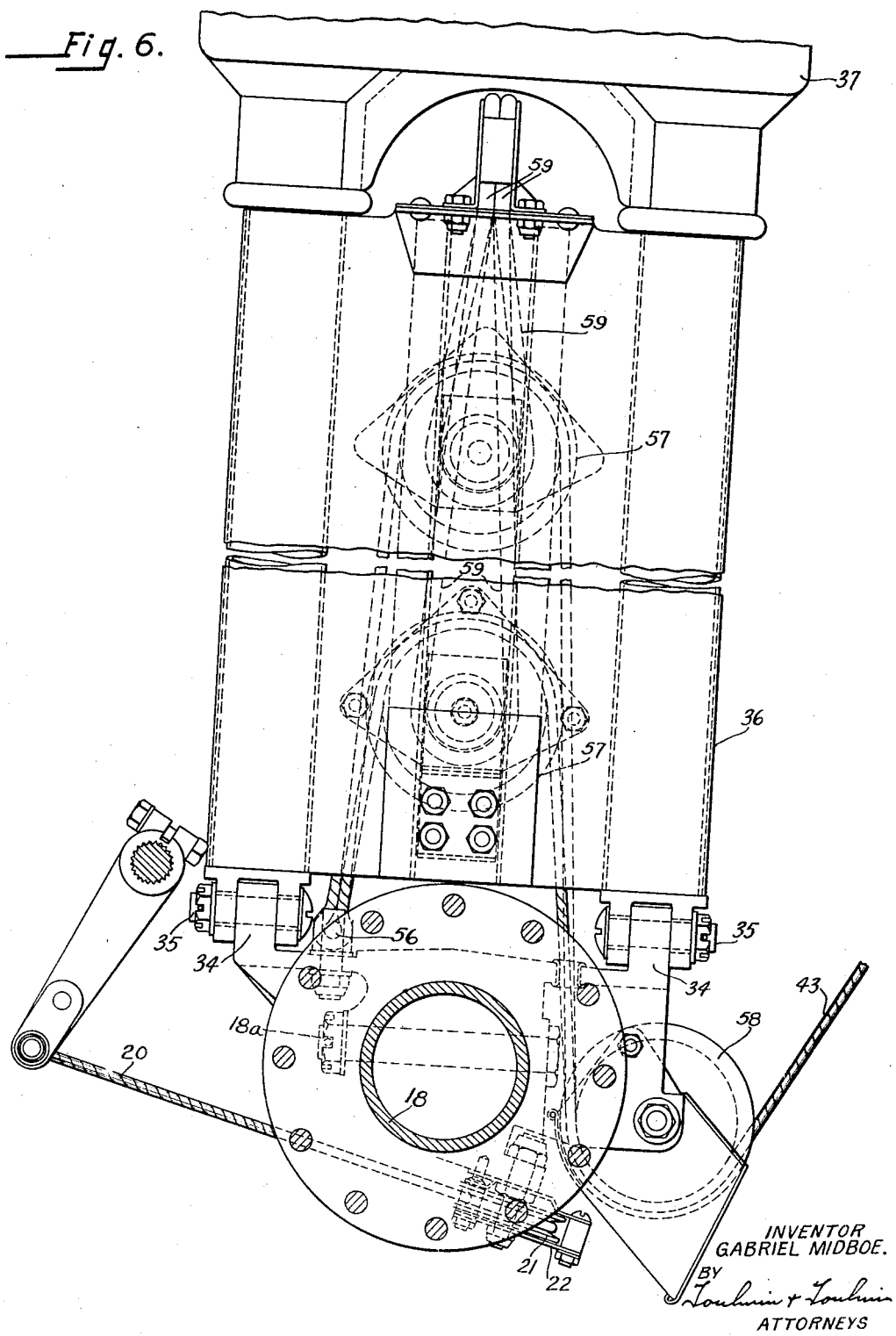

Nov. 14, 1933.　　　G. MIDBOE　　　1,934,992
RETRACTABLE LANDING GEAR
Filed March 13, 1933　　5 Sheets-Sheet 5
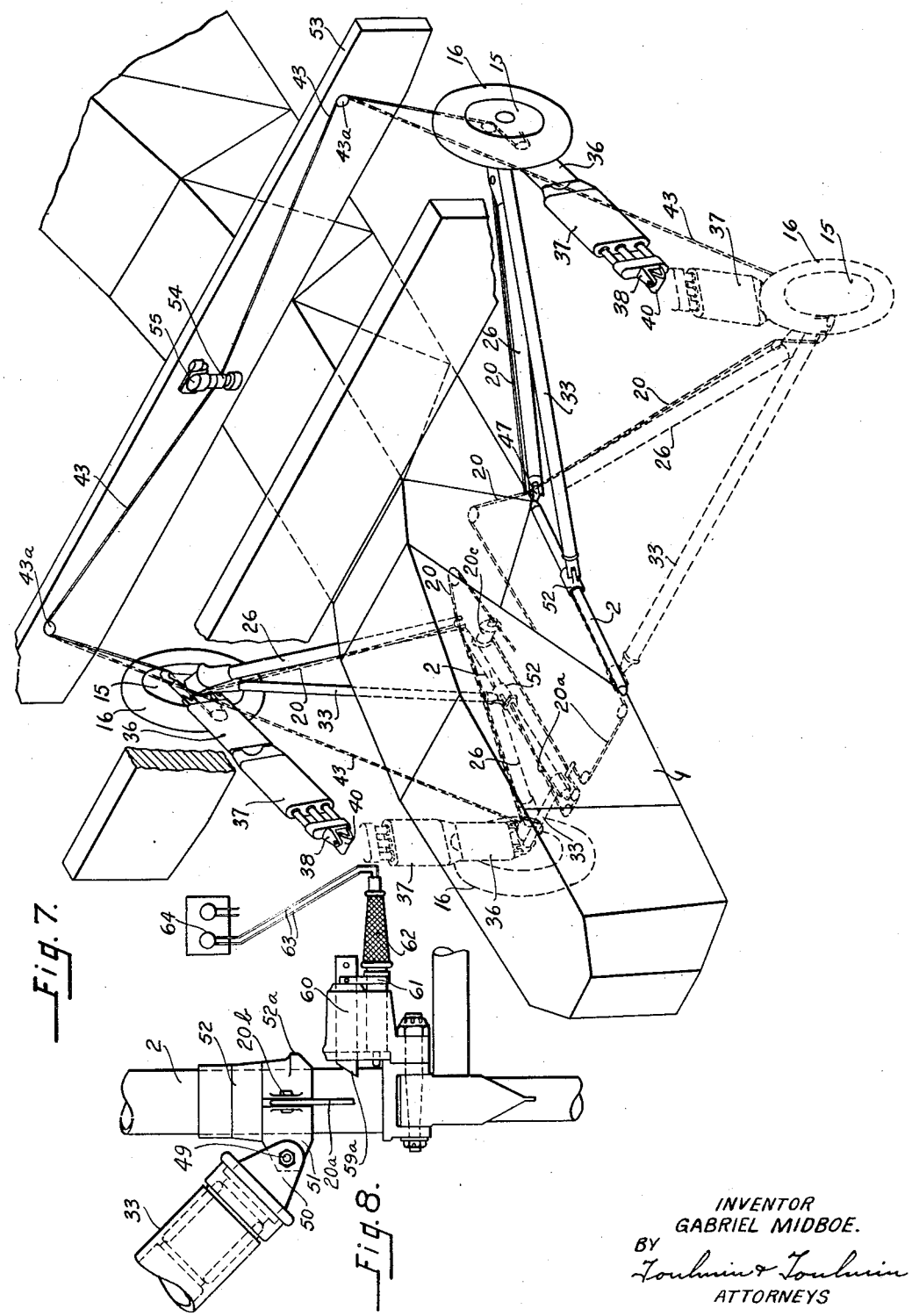
INVENTOR
GABRIEL MIDBOE.
BY
Toulmin & Toulmin
ATTORNEYS Patented Nov. 14, 1933

1,934,992

UNITED STATES PATENT OFFICE 1,934,992

RETRACTABLE LANDING GEAR

Gabriel Midboe, Brooklyn, N. Y., assignor to General Aviation Manufacturing Corporation, Dundalk, Md., a corporation of Delaware Application March 13, 1933. Serial No. 660,556

23 Claims. (Cl. 244—2)

My invention relates to a landing gear and in particular to the means and method of mounting the gear, the location of its mounting, the location of its retraction, and the connection between the landing gear, the fuselage, the engine nacelle and the wing structure.

It is my particular object to provide a landing gear which can be retracted into a position remote from the fuselage to a point within the wing structure and within a nacelle such as an engine nacelle carried by the wing structure.

It is my object to use the nacelle engine housing or a separate compartment thereof as the storage chamber for the retracted landing gear.

It is my object to provide a fixed brace strut and a slidable axle strut slidable on the fuselage longéron so that when in retracted position, the struts are in substantial alignment with one another when viewed from the front of the airplane, and when in landing position, the struts form with the longéron a triangular structure.

It is a further object to provide an axle strut in which the axle is a continuation and extension of the strut, the strut being pivoted to the longéron of the fuselage while the brace strut is slidable on the longéron and rotatably mounted upon the axle, while at the same time the shock absorber is pivotally connected to the axle and to its point of attachment in the nacelle so that by this arrangement during landing, the landing gear is completely braced against landing shock which is transmitted to the structural members of the plane while permitting the free operation of the shock absorber, and when flying, the wheel and shock absorber are substantially nested within the nacelle and have the benefit of its stream line, and the brace strut and axle strut are so positioned as to offer the minimum resistance to the air stream.

Referring to the drawings, Figure 1 is a side elevation of the plane in landing position.

Figure 2 is a side elevation of the plane in flying position with the landing gear retracted as shown by the partially broken away nacelle.

Figure 3 is a front elevation of a portion of the ship, having the fuselage broken away to show the connection between the axle strut and brace strut with the longéron: it should be noted that this view is taken with the fuselage in landing position and therefore tilted at an angle to the horizontal, and for the purpose of illustration, the longéron is sectioned in two places to show the sliding connection of the brace strut and the pivotal attachment of the axle strut to the longéron.

Figure 4 is a detailed view of the connections between the axle, the axle strut, the brace strut and the shock absorber illustrating the application of the control cables.

Figure 5 is a front elevation partially in section of the continuation of the upper end of the shock absorber strut and its connection to the engine nacelle structure.

Figure 6 is a side elevation of the landing gear strut.

Figure 7 is a diagrammatic view comprising an isometric perspective of the landing gear in retracted and extended position, together with the associated cables.

Figure 8 is a detailed plan view of the right hand longéron locking mechanism and associated sliding strut.

Figure 1:
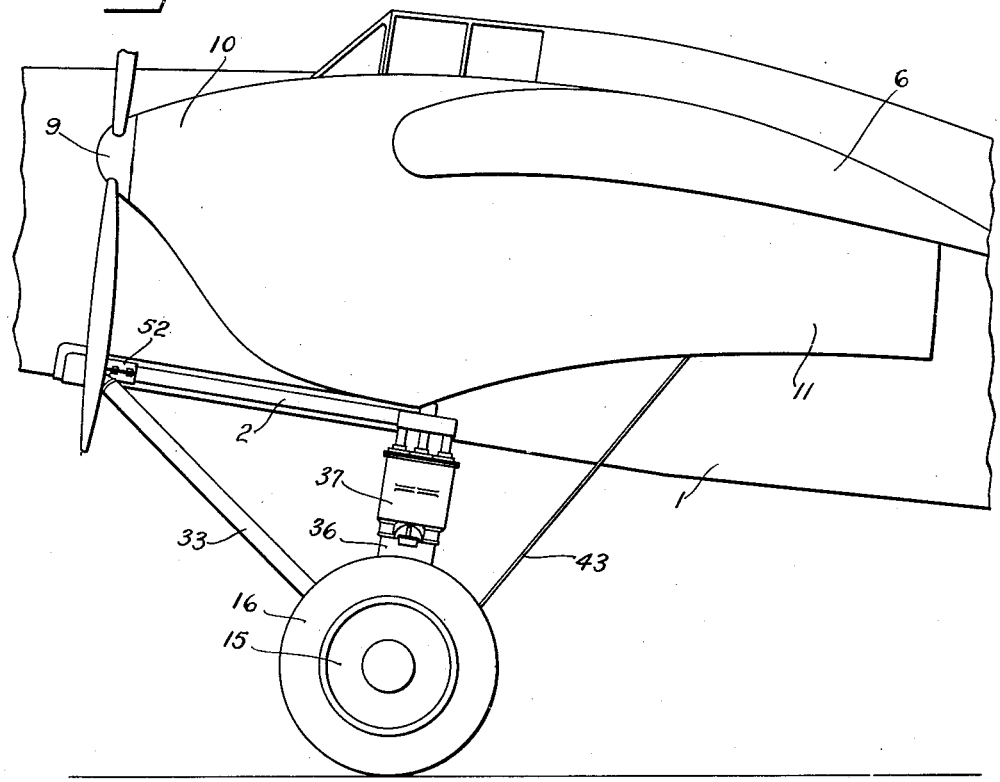
Figure 2:
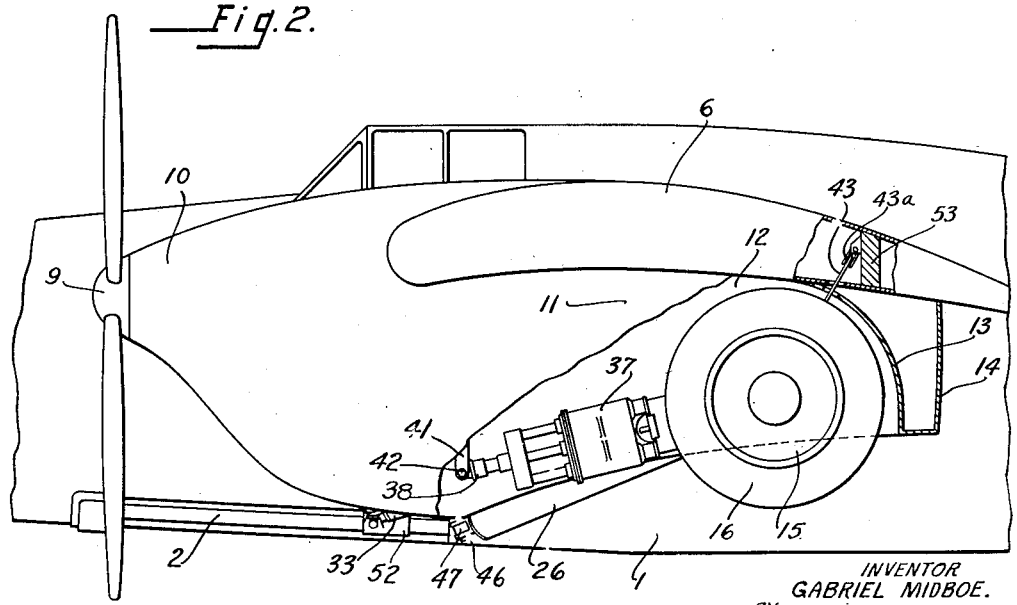

Referring to the drawings, 1 indicates the fuselage of an airplane having a longéron 2 connected to the remainder of the fuselage framework by the members 3, 4 and 5, the exact details of which are not important in this invention.

Mounted on the fuselage 1 is the wing structure 6 having an engine nacelle 7. 8 and 9 indicate engines. The engine nacelle 7 extends downwardly below the wing and is formed with a stream line nose 10 and upwardly rearwardly disposed side walls 11 below the wing 6. Within these side walls 11 is a pocket 12 enclosed at the rear by the rear walls 13 and 14. Within this pocket is retracted the landing gear.

The landing gear consists of a wheel 15 having a tire 16. This wheel is mounted on bearings 17 upon the axle 18, which axle is mounted within the hub 23 and retained therein by the bolt 18a. A brake generally designated 19 is provided which is actuated by the brake cable 20 in any suitable manner, as the exact details of the brake construction are not important in this invention. This cable 20 is guided by the sheave 21 carried on the bracket 22 on the axle hub 23. The cable 20 passes over the sheave 24 which is mounted on the elbow 25 of the axle strut 26. A third sheave 27 guides the cable through the guide sleeve 28, whence the cable passes into a point adjacent the pilot's seat in the fuselage.

The elbow 25 is provided with a shoulder 29 and the axle hub is provided with a shoulder 30, between which shoulders is mounted a rotatable collar 31 to which is pivotally connected by the bolt 32 the sliding brace strut 33. The hub 23 is connected between ears 34 by the bolt 35 to the lower end of the shock absorber strut 36 which carries the shock absorber 37 and is mounted at its upper end through the fittings 38, bolt 39, fitting 40 on a portion 41 of the nacelle structure. The bolt 39 provides for lateral pivoting on a fore and aft axis and the bolt 42 provides for transverse pivoting. The cable 43 is connected at 44 to the landing gear and extends upwardly into the nacelle and thence to a point in the fuselage where it is operated to retract the landing gear. The landing gear is moved forwardly by the cable.

The inner end of the axle strut is pivoted on a fore and aft axis on the bolt 46, which in turn is pivoted upon a stub axle 47 that is rotatably mounted in a sleeve 48 that is carried on the longéron 2. As the landing gear swings from retracted position to landing position and vice versa, the axle 47 rotates in the sleeve 48 and the axle strut pivots on the bolt 46. The brace strut 33 during this movement of the landing gear pivots at its outer end on the bolt 32 while the sleeve 31 rotates on the axle hub 23 and at its inner end the brake strut 33 is pivoted on the bolt 49 by the ears 50 on the brace strut and ears 51 of a collar 52 that slides on the longéron 2.

When the structure is in landing position, this collar 52 and the inner end of the brace strut 33 is in the forward position. When the landing gear is in retracted position, the inner end of the brace strut moves backwardly adjacent the pivotal connection of the axle strut with the longéron. Furthermore, when in this retracted position, if the ship is viewed from the nose of the fuselage at the front, it will be seen that the two struts are in substantial alignment horizontally and thereby present the minimum interference in the passage of the plane through the air.

In landing position both struts assume a diagonal position while the landing gear strut 36 assumes a vertical position with respect to the longitudinal axis of the plane.

I prefer to leave the cables for retracting the landing gear over the pullleys 43a on the rear spar 53.

The cable 43 is wound upon the drum 54 which may be actuated by a motor 55 or by other means.

The forward end of the cable 43 is anchored at 56 and thence passes over the pulley 57 downwardly under the pulley 58. The pulley 57 is resiliently mounted on the shock absorber cords 59 within the landing gear strut. This automatically provides a means of taking up the slack in the cable 43 as it is moved from one posiiton to the other.

The cable 20a is connected at 20b to the sleeve 52 to pull it into the home position so that the shoulder 52a will engage with the latch 59 and is carried in the sleeve 60 and is actuated by the finger 61 connected in turn with the actuator 62.

This latch is connected by the lines 63 to a light 64 on the dashboard to indicate its position so that the pilot may know whether the latching has actually taken place or not.

The cables 20a lead over suitable guide pulleys to a point adjacent the pilot seat where they are wound or unwound from the cable winding drum 20c.

In Figure 4 and in Figure 6 the several positions of the pulley 57 are indicated in full and dotted lines.

It will be understood that I desire to comprehend within my invention all the modifications necessary to adapt it to varying conditions and uses.

Having thus fully described my invention, what I claim as new and desire to secure by Letters Patent, is:

1. In an airplane having a fuselage, a wing, an engine nacelle mounted on the wing, a landing gear connected to the nacelle on the wing, and means of retracting a portion of the landing gear to a point within the engine nacelle, including a slidably movable part connected to said fuselage.

2. In an airplane having a fuselage, a wing, an engine nacelle mounted on the wing, a landing gear connected to the fuselage and to the nacelle on the wing, and means of retracting a portion of the landing gear to a point within the engine nacelle, said connection between the landing gear and the fuselage comprising an axle strut and a brace strut slidably movable rearwardly.

3. In an airplane having a fuselage, a wing, an engine nacelle mounted on the wing, a landing gear connected to the fuselage and to the nacelle on the wing, means of retracting a portion of the landing gear to a point within the engine nacelle, said connection between the landing gear and the fuselage comprising an axle strut and a brace strut, and a common longéron support in the fuselage for the inner ends of said struts, said axle strut being movable on said longéron.

4. In an airplane having a fuselage, a wing, an engine nacelle mounted on the wing, a landing gear connected to the fuselage and to the nacelle on the wing, means of retracting a portion of the landing gear to a point within the engine nacelle, said connection between the landing gear and the fuselage comprising an axle strut and a brace strut, and a common longéron support in the fuselage for the inner ends of said struts said axle strut being movable on said longéron, the other ends of said struts being pivotally connected to one another adjacent their outer ends.

5. In an airplane having a fuselage, a wing, an engine nacelle mounted on the wing, a landing gear connected to the fuselage and to the nacelle on the wing, means of retracting a portion of the landing gear to a point within the engine nacelle, said connection between the landing gear and the fuselage comprising an axle strut and a brace strut, and a common longéron support in the fuselage for the inner ends of said struts, the other ends of said struts being pivotally connected to one another adjacent their outer ends, said brace strut being slidably mounted on the longéron and the axle strut pivotally mounted thereon.

6. In an airplane having a fuselage, a wing, an engine nacelle mounted on the wing, a landing gear connected to the fuselage and to the nacelle on the wing, means of retracting a portion of the landing gear to a point within the engine nacelle, said connection between the landing gear and the fuselage comprising an axle strut and a brace strut, and a common longéron support in the fuselage for the inner ends of said struts, the other ends of said struts being pivotally connected to one another adjacent their outer ends, said brace strut being slidably mounted on the longéron and the axle strut pivotally mounted thereon, said pivot comprising a transverse and longitudinal pivot for the universal connection of the inner end of the axle strut.

7. In combination in an airplane, of a fuselage, a wing, an engine nacelle, a retractable landing gear pivoted on said nacelle, said nacelle having a chamber for receiving the landing gear when in retracted position, a universally pivoted axle strut inter-connected to the fuselage and to the landing gear, a brace strut pivoted to the landing gear and slidably and pivotally connected to the fuselage.

8. In an airplane, a fuselage, a longéron therein, a landing gear mounted for retraction with respect to the wing, an axle strut pivoted to the longéron forming a part of the landing gear at its outer end, and a brace strut pivoted at the outer end of the axle strut and slidably connected to said longéron whereby as the axle strut moves up and down during retraction, the brace strut will move up and down therewith and will also move longitudinally at its inner end fore and aft of the fuselage.

9. In combination, an airplane fuselage and a wing, an axle strut universally pivoted to the side of the fuselage carrying a wheel on the outer end, a universally pivoted shock absorber strut and shock absorber connected to said wing structure and to the outer end of the axle strut and adapted to have its length changed, and a brace strut universally pivoted to the outer end of the axle strut and slidably and pivotally connected to the fuselage.

10. In combination, an airplane fuselage and a wing, an axle strut universally pivoted to the side of the fuselage carrying a wheel on the outer end, a universally pivoted shock absorber strut and shock absorber connected to said wing structure and to the outer end of the axle strut and adapted to have its length changed, a brace strut universally pivoted to the outer end of the axle strut and slidably and pivotally connected to the fuselage, and means for retracting the landing gear into a pocket on the wing structure.

11. In combination in a landing gear of an airplane, a fuselage, an angular axle strut comprising an axle, a hub and a strut, said hub and axle being connected to the strut by an elbow, means of universally pivoting the inner end of the strut on the fuselage, a collar on said hub, a brace strut pivoted thereto at its outer end, means of slidably mounting and pivoting said brace strut on the fuselage on its inner end, means on said hub for pivotally connecting the lower end of a shock absorber strut, means of universally connecting the hub end of the shock absorber strut to the wing structure, a wheel on said axle and means of retracting said landing gear by moving it upwardly and rearwardly when retracted or downwardly and forwardly when in landing position.

12. In an airplane landing gear, a wheel and axle, means connecting said wheel and axle to the airplane comprising a fore and aft swinging shock absorber strut, a laterally extending axle strut pivoted to the fuselage of the airplane and a laterally moving, laterally disposed brace strut slidably mounted on the airplane.

13. In combination in a landing gear of an airplane, a brace strut comprising a diagonal and horizontal portion having a wheel on the outer end and universally pivoted on its inner end to the plane, a brace strut connected adjacent the outer end of the axle strut and slidably connected on its inner end on the airplane.

14. In combination in a landing gear of an airplane, a brace strut comprising a diagonal and horizontal portion having a wheel on the outer end and universally pivoted on its inner end to the plane, a brace strut connected adjacent the outer end of the axle strut and slidably connected on its inner end on the airplane, and a vertically disposed shock absorber strut connected at one end to the axle strut and to the other end to the airplane at a point remote from the points of attachment of the axle and the brace struts.

15. In a landing gear for an airplane, an axle strut having a wheel on the outer end and a universal pivot on its inner end, a brace strut pivoted on its outer end on a rotatable collar mounted upon the axle strut and slidably mounted on its inner end, means for pivotally mounting it upon its slidable mounting, a shock absorber strut pivotally mounted on the axle strut at one end and universally mounted at its other end.

16. In a landing gear of an airplane a fuselage, an angular axle strut extending downwardly from the fuselage and terminating in a hub angularly disposed with respect to the strut, an axle mounted in said hub, means of attaching a shock absorber strut to said hub pivotally, a shock absorber strut, a rotatable collar mounted on said hub, and a brace strut pivoted to said collar.

17. In a landing gear of an airplane a fuselage, an angular axle strut extending downwardly from the fuselage and terminating in a hub angularly disposed with respect to the strut, an axle mounted in said hub, means of attaching a shock absorber strut to said hub pivotally, a shock absorber strut, a rotatable collar mounted on said hub, a brace strut pivoted to said collar, and means to universally pivot the inner end of the axle strut on an airplane, slidably mount the inner end of the brace strut on the airplane, and universally pivot the shock absorber strut on the airplane.

18. In a landing gear of an airplane, an angular axle strut terminating in a hub angularly disposed with respect to the strut, an axle mounted in said hub, means of attaching a shock absorber strut to said hub pivotally, a shock absorber strut, a rotatable collar mounted on said hub, a brace strut pivoted to said collar, means to universally pivot the inner end of the axle strut on an airplane, slidably mount the inner end of the brace strut on the airplane, and universally pivot the shock absorber strut on the airplane, and means for interposing a pivoted connection between the inner end of the brace strut and its slidable connection to the airplane.

19. In combination in an airplane of a fuselage having a horizontally disposed longéron, means to universally pivot the inner end of an axle strut thereon, means to slidably and pivotally connect the inner end of a brace strut thereon in front thereof, means to universally connect the outer ends of said brace strut and axle strut, a wheel on the end of the axle strut, and means to universally connect the outer end of said axle strut to a remote point on the plane.

20. In combination in an airplane of a fuselage having a horizontally disposed longéron, means to universally pivot the inner end of an axle strut thereon, means to slidably and pivotally connect the inner end of a brace strut thereon in front thereof, means to universally connect the outer ends of said brace strut and axle strut, a wheel on the end of the axle strut, means to universally connect the outer end of said axle strut to a remote point on the plane, and means to retract and lift rearwardly the landing gear, means to house the wheel, axle end of the axle strut and shock absorber strut within a pocket in the airplane.

21. In an airplane, a landing gear comprising a fore and aft swinging shock absorber strut, a vertically and horizontally moving axle strut pivoted at its inner end and a horizontally moving, vertically moving and bodily slidable brace strut pivoted to the axle strut and slidably mounted on the plane.

22. In an airplane landing gear, a fuselage, a longéron, an axle strut universally pivoted on the longéron having an angular hub at its outer end, an axle mounted in said hub and projecting therefrom, a wheel on the axle, a sleeve on the hub, a brace strut pivoted on said sleeve at its outer end and slidably and pivotally mounted on the longéron at its inner end, a shock absorber strut pivoted on said hub at its lower end and universally pivoted to a point adjacent a wing on its outer end.

23. In an airplane landing gear, a fuselage, a longéron, an axle strut universally pivoted on the longéron having an angular hub at its outer end, an axle mounted in said hub and projecting therefrom, a wheel on the axle, a sleeve on the hub, a brace strut pivoted on said sleeve at its outer end and slidably and pivotally mounted on the longéron at its inner end, a shock absorber strut pivoted on said hub at its lower end and universally pivoted to a point adjacent a wing on its outer end, an engine nacelle on the wing having a pocket adapted to receive the shock absorber strut, wheel and axle therein.

GABRIEL MIDBOE.